US007873528B2

(12) United States Patent
Bregante et al.

(10) Patent No.: US 7,873,528 B2
(45) Date of Patent: Jan. 18, 2011

(54) HEALTHCARE CLAIMS LOSS CONTROL SYSTEMS AND METHODS

(75) Inventors: George J. Bregante, Ventura, CA (US); Dennis J. Day, Corona del Mar, CA (US); Daniel T. Day, Corona del Mar, CA (US); Edward R. Day, Newport Beach, CA (US)

(73) Assignee: TC3 Health, Inc., Costa Mesa, CA (US)

( * ) Notice: Subject to any disclaimer, the term of this patent is extended or adjusted under 35 U.S.C. 154(b) by 0 days.

(21) Appl. No.: 11/426,527

(22) Filed: Jun. 26, 2006

(65) Prior Publication Data

US 2007/0011031 A1 Jan. 11, 2007

Related U.S. Application Data

(60) Provisional application No. 60/694,182, filed on Jun. 27, 2005.

(51) Int. Cl.
*G06Q 40/00* (2006.01)
*G06Q 10/00* (2006.01)
*G06N 5/02* (2006.01)

(52) U.S. Cl. .................................. 705/4; 705/2; 705/3
(58) Field of Classification Search .................. 705/2–4
See application file for complete search history.

(56) References Cited

U.S. PATENT DOCUMENTS

| 5,359,509 | A | * | 10/1994 | Little et al. ..................... 705/2 |
| 5,577,169 | A | | 11/1996 | Prezioso |
| 6,208,973 | B1 | * | 3/2001 | Boyer et al. ..................... 705/2 |
| 6,253,186 | B1 | * | 6/2001 | Pendleton, Jr. .................. 705/2 |
| 6,341,265 | B1 | * | 1/2002 | Provost et al. ................... 705/4 |
| 6,343,271 | B1 | * | 1/2002 | Peterson et al. ................. 705/4 |
| 6,792,410 | B1 | * | 9/2004 | Donovan et al. ................ 705/4 |
| 6,826,536 | B1 | * | 11/2004 | Forman .......................... 705/4 |
| 7,359,880 | B2 | * | 4/2008 | Abel et al. ..................... 705/39 |
| 2001/0051919 | A1 | * | 12/2001 | Mason ......................... 705/40 |
| 2003/0149594 | A1 | | 8/2003 | Beasley et al. |

(Continued)

OTHER PUBLICATIONS

Internet Archive Wayback Machine—TC3Healthcare.com websites as downloaded on Apr. 5, 2010.*
Phelan, John L "Pay Incentives to PHysicians for Filing Electronic Claims" Managed Care—Oct. 2003.*
Press Release, "MEDInnovation launched as Single Source Solution for medical TPAs, through joint offering" Jun. 2005.*

(Continued)

*Primary Examiner*—Neal R Sereboff
(74) *Attorney, Agent, or Firm*—Knobbe, Martens, Olson & Bear, LLP (57) ABSTRACT

A method for controlling healthcare claim payment losses including accessing information about a claim after a payer is prepared to pay, but prior to payment, evaluating the information including at least one of determining indications of fraud, validating service coding and editing as indicated, identifying possible payment discounts, and developing analytics indicative of risk for future claims, and providing loss control recommendations based at least partially on the evaluation, prior to paying the claim. Also a loss control system for healthcare claims with a loss control engine and a database in communication with the loss control engine, wherein the loss control engine accesses information about healthcare claims from the database after the claims have been processed for payment and wherein the loss control engine further analyses the claims for potential cost savings and returns a loss control recommendation for each claim to the database before payment of the respective claim.

16 Claims, 9 Drawing Sheets

U.S. PATENT DOCUMENTS

2003/0229519 A1* 12/2003 Eidex et al. .................. 705/2
2004/0111292 A1 6/2004 Hutchins
2005/0044357 A1 2/2005 Fano
2005/0273431 A1* 12/2005 Abel et al. .................. 705/42
2006/0217824 A1* 9/2006 Allmon et al. ............... 700/90

OTHER PUBLICATIONS

Notification of Transmittal of the International Search Report and the Written Opinion of the Int'l Searching Authority, or the Declaration, PCT/US2006/24860, dated Apr. 23, 2007, 9 pgs.

* cited by examiner

HEALTHCARE CLAIMS LOSS CONTROL SYSTEMS AND METHODS

CROSS-REFERENCE TO RELATED APPLICATIONS

This application claims the benefit of U.S. Provisional Application 60/694,182 filed Jun. 27, 2005 entitled "SYSTEMS AND METHODS OF PROCESSING AND STORING HEALTHCARE DATA" which is incorporated herein in its entirety by reference.

BACKGROUND OF THE INVENTION

1. Field of the Invention

The invention relates to the field of healthcare claims and to systems and methods to improve loss control in payment of claims.

2. Description of the Related Art

When an insured patient receives medical services and/or products from a health care provider, a health care claim typically results in reimbursement/payment of charges associated with the health care services. A health care claim frequently undergoes some type of internal processing by a payer, such as a health care insurance company. Once the processing is completed, the claim is forwarded for payment. Governmental regulations applying to the health care insurance industry generally require that claims be processed and paid as indicated in a timely manner.

A troublesome aspect of the health care field is that a disproportionately large fraction of the costs incurred are attributable to a disproportionately small fraction of the insured population. This phenomena is at least partly to be expected as a majority of people are relatively healthy and injury-free for a large fraction of their life and thus would not be expected to incur significant medical costs. However, there are non-negligible unwarranted costs associated with at least some health care claims. For example, honest mistakes and misunderstanding of proper formulation of a health care claim can result in unwarranted, inflated costs associated with the claim. In addition, incidents arise of intentional abuse and/or fraud of the health care provision and payment system. For example, a provider can duplicate the bill for the same service provided, over bill for the number of units provided, and/or conduct excessive testing beyond that which would be considered medically necessary for the given case.

SUMMARY OF THE INVENTION

Considering the substantial sums involved, it will be appreciated that there is a need for loss control in health care claim payments to mitigate losses for unwarranted payments made. As used herein, loss control encompasses broad concepts entailing multiple aspects of cost containment depending upon the particular circumstances of a given claim. For example, loss control can entail inhibiting payment on fraudulent claims. Loss control can also entail verification that the actual services provided correspond with claim payments requested and can further entail revision of the claim should there be errors in correspondence between the services provided and a corresponding claim payment. Loss control can also, in certain implementations, include identifying available payment discounts that may be available for the services provided for the claim. In yet other implementations, loss control can entail data analysis and resulting analytics to identify emerging high risk/high cost situations, for example an emerging new fraud scheme or a patient/patient population exhibiting likely onset of future high cost claims.

However, certain limitation and difficulties have been identified in more effectively providing loss control for payment of health care claims. For example, recovering losses after payment of a claim has occurred limits effectiveness for the payer to recover these losses. In another aspect, while a variety of loss control services exist, for example fraud identification services and claim management services, a system for effectively coordinating these services has been lacking. A further limitation is that the proper coding of a health care claim for services provided and possible fraud schemes can be relatively complex. Thus, internal processing conducted for example by a payer, has limited ability to identify for example coding errors and fraudulent claims. In addition, in certain implementations the pressures of handling a large number of claims each in a timely manner can be such that the return on investment for a payer to enact more thorough loss control processes is insufficient. An additional limitations is that different clients often have different formatting of information and this further complicates efficient coordination of resources in controlling losses.

Various embodiments of the invention address the above-identified needs and limitations in existing loss control systems. Embodiments of the invention provide systems and methods to more effectively perform loss control in payment of a health care claim to provide cost saving benefits to the payer as well as to safeguard or improve the integrity of a health care claim system. At least certain embodiments of the invention provide loss control intervention at a point in the processing of a health care claim prior to payment of the claim. These embodiments provide the significant advantage of providing at least some loss control procedures before the claim is paid thereby reducing the value of claim loses which otherwise need to be recovered after payment of the claim.

At least certain other embodiments provide an efficient single point of contact between payers, providers, and other entities to more efficiently integrate information access and sharing. These aspects facilitate more efficient and timely processing of a health care claim to provide a payer with more effective loss control, provide payment to the provider in a timelier manner, and more effectively maintain integrity of an overall health care and health care payment system.

In certain aspects, embodiments of the invention provide claim optimization. As used herein, the terms "optimal", "optimize," "optimizing," "optimization", "minimize", "maximize" and the like are to be understood as commonly used terms of the art referring simply to a process of evaluating and processing of a claim to provide a more accurate claim. Claim "optimization" refers generally to a process of identifying and correcting errors in a claim, filtering for fraudulent claims, and or obtaining available discounts for the claim. It will be understood that there are frequently costs associated with improving the accuracy of a claim and seeking discounts. Thus, in certain applications, optimization of a claim involves a cost/benefit decision. In many applications, available processing and information as well as time constraints can result in processed claims that are more accurate and reflect cost savings, but wherein the possibility of further improvements in accuracy and/or additional cost savings may be available, at least in certain instances. Thus, use of the terms "optimal", "optimize," "optimizing," "optimization" and the like does not imply that the described process results in a perfect result or that any further improvements are not available. Thus, the terms "optimize," "optimizing," and/or "optimization" are to be interpreted as relative terms indicating generally improved quality in an individual application and are not to be interpreted as absolutes.

One embodiment includes a method of controlling healthcare claim payment losses, the method comprising accessing information about a healthcare claim after a payer is prepared to pay the claim, but prior to payment of the claim, evaluating the claim information, wherein the evaluating comprises at least one of determining indications of a fraudulent claim, validating service coding and editing the coding as indicated, identifying possible claim payment discounts, and developing analytics indicative of risk for future claims, and providing loss control recommendations based at least partially on the evaluation, prior to the payer paying the claim.

Another embodiment includes a loss control system for healthcare claims, the system comprising a healthcare claim loss control engine and a database in communication with the loss control engine, wherein the loss control engine accesses information about healthcare claims from the database after the claims have been processed for payment and wherein the loss control engine further analyses the claims for potential cost savings and returns a loss control recommendation for each claim to the database before payment of the respective claim.

A further embodiment includes a loss control system for healthcare claims, the system comprising means for accessing information about a healthcare claim after a payer is prepared to pay the claim, but prior to payment of the claim, means for evaluating the claim information, wherein the evaluating comprises at least one of determining indications of a fraudulent claim, validating service coding and editing the coding as indicated, identifying possible claim payment discounts, and developing analytics indicative of risk for future claims, and means for providing loss control recommendations based at least partially on the evaluation, prior to the payer paying the claim. These and other objects and advantages of the invention will become more apparent from the following description taken in conjunction with the accompanying drawings.

DETAILED DESCRIPTION OF THE PREFERRED EMBODIMENT

Figure 1:
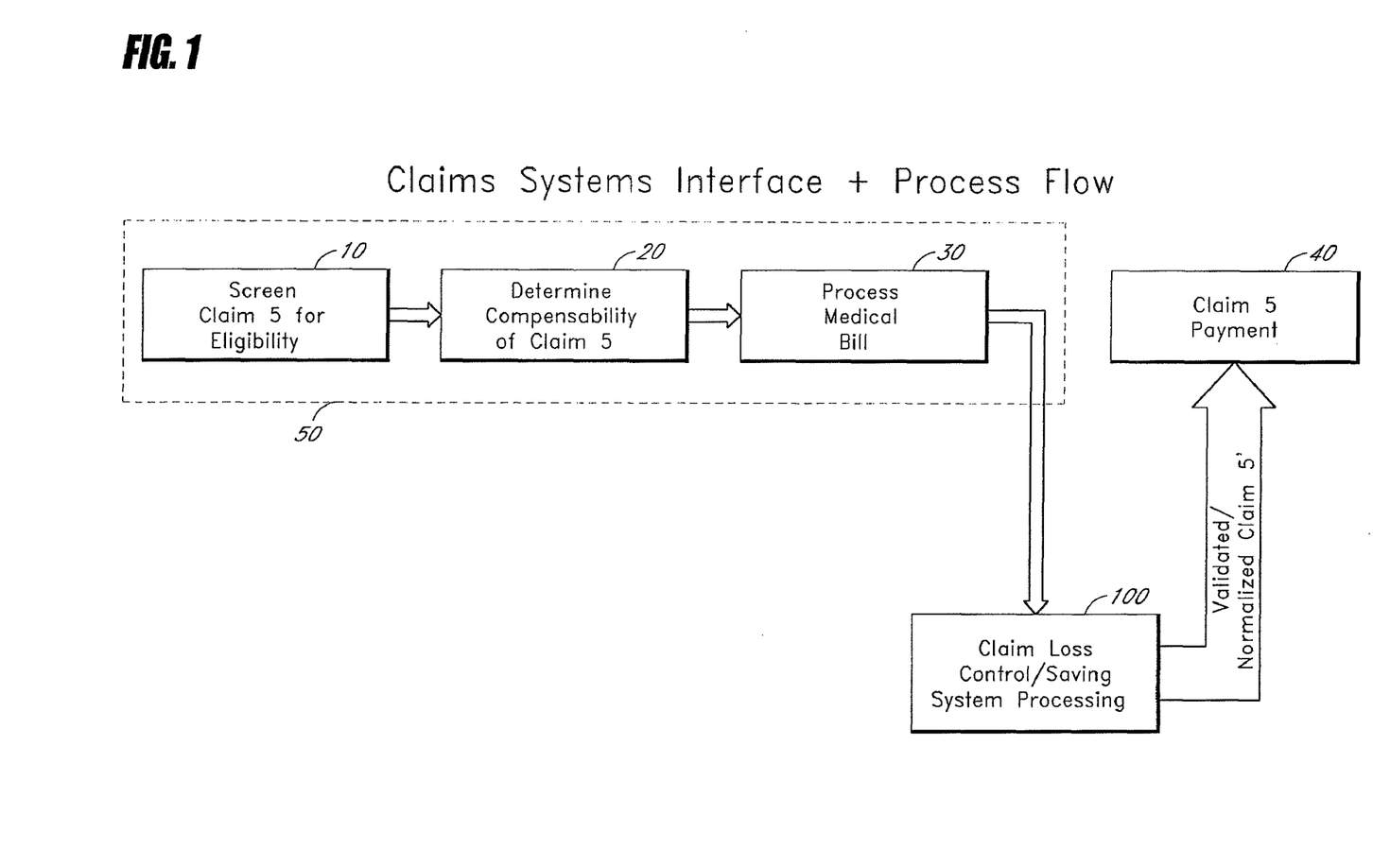
FIG. 1 is a work-flow diagram of one embodiment of a healthcare claims loss control system and method.

FIG. 1 illustrates a high level work flow diagram for one embodiment of a health care claims loss control system and method 100 including one embodiment of interaction of the system 100 with a health care claim payment process. In this embodiment, in a block 10 a health care claim 5 is screened for eligibility. For example, in one implementation, the claim 5 is screened to verify that the claim corresponds to a qualified member of the payer's group and that the premium is current for that member.

A block 20 follows wherein the compensability of the claim 5 is determined. For example, the block 20 can include confirming that the services associated with the claim 5 are covered services and that any indicated deductibles have been satisfied. In a block 30, the claim 5 is further processed to result in a medical bill that would otherwise be ready for payment of the claim 5 in a block 40.

The actions and processes of blocks 10, 20, and 30 can also be referred to as an adjudication process 50. The adjudication process or block 50 refers, in one embodiment, to processing or screening performed internally by a payer and resulting in a medical bill that is otherwise ready for payment. It will be understood that in certain embodiments, an adjudication process or block 50 can include certain aspects of loss control. For example, the screening of block 10 verifies that the claim 5 is associated with an eligible member of the payer organization. The compensability determination of block 20 inhibits payment of a claim for services and/or products not covered by the payer.

In at least certain embodiments, a claim 5 which may have undergone an adjudication process 50 is forwarded to the system 100 for additional loss control processing before being paid in a block 40. In one embodiment, the system 100 provides a validated and/or normalized claim 5' wherein in at least certain instances, the validated/normalized claim 5' represents costs savings compared to the corresponding claim 5 before processing by the system 100. A significant advantage of at least certain embodiments is that the loss control processing provided by the system and method 100 occurs before payment of the claim in a block 40. Thus, any cost savings associated with the claim 5' are realized before the claim is paid reducing the need to recover comparable cost savings after payment has already been made.

Figure 2:
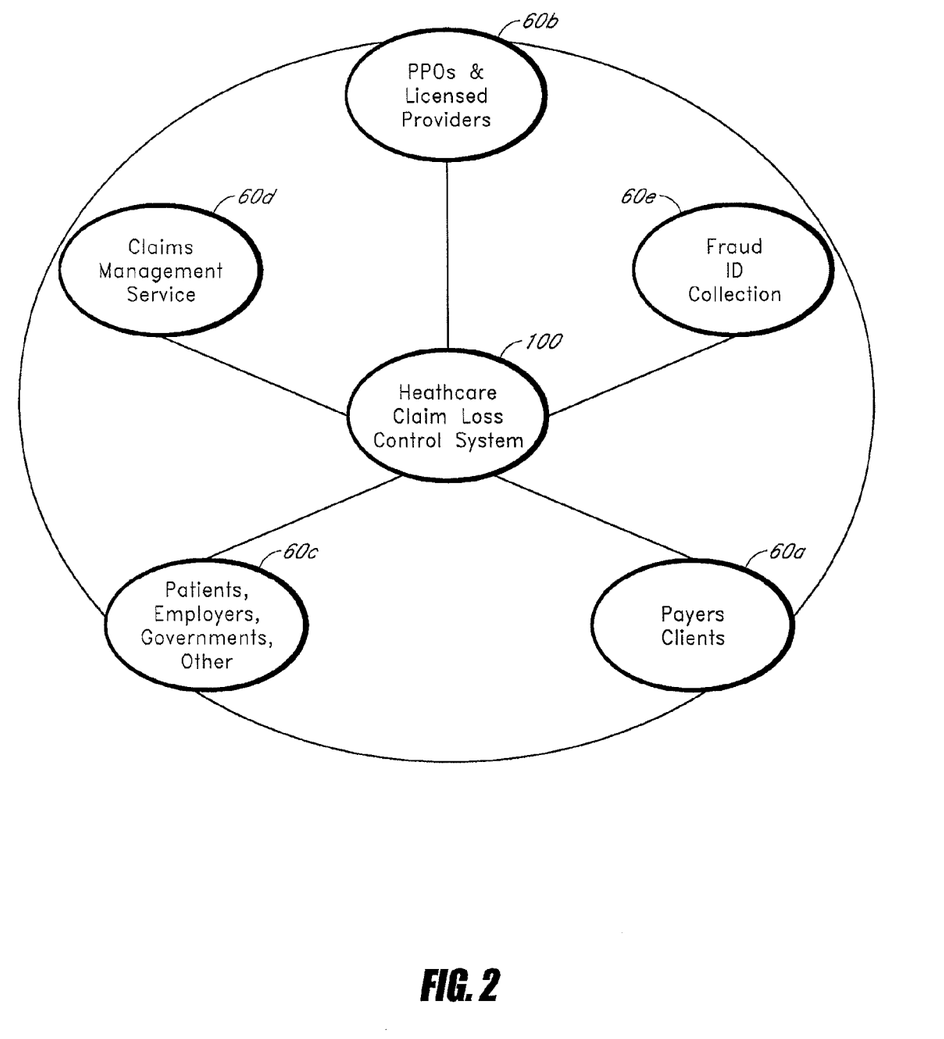
FIG. 2 is a block diagram illustrating one embodiment of a healthcare claims loss control system and method and interfaces with various parties.

FIG. 2 is a block diagram illustrating one embodiment of a health care claims loss control system and method 100 and interfaces with one or more other entities or parties 60. In one exemplary implementation, the other parties or entities include one or more of payer clients 60a, preferred provider organizations (PPOs) and licensed providers 60b, patients, employers, governmental agencies, etc. 60c, claims management services 60d and fraud ID collection agencies 60e. In certain embodiments, the system 100 is in communication with one or more of the other parties or entities 60. In certain preferred embodiments, connection/communication between the system 100 and any other entities 60 is provided as a secure communication.

Implementation of various secure communication protocols, password protection systems, encryption systems, digital signature certificates, etc. will be well understood and readily implemented by one of ordinary skill. As the system 100 provides a common link among one or a plurality of other entities 60, the system 100 is positioned to facilitate coordination and integration of the abilities and needs of the various other entities 60 as well as to facilitate more efficient exchange and utilization of information therebetween. Thus, the system 100 can be considered to provide a single point of contact for multiple parties 60.

Figure 3:
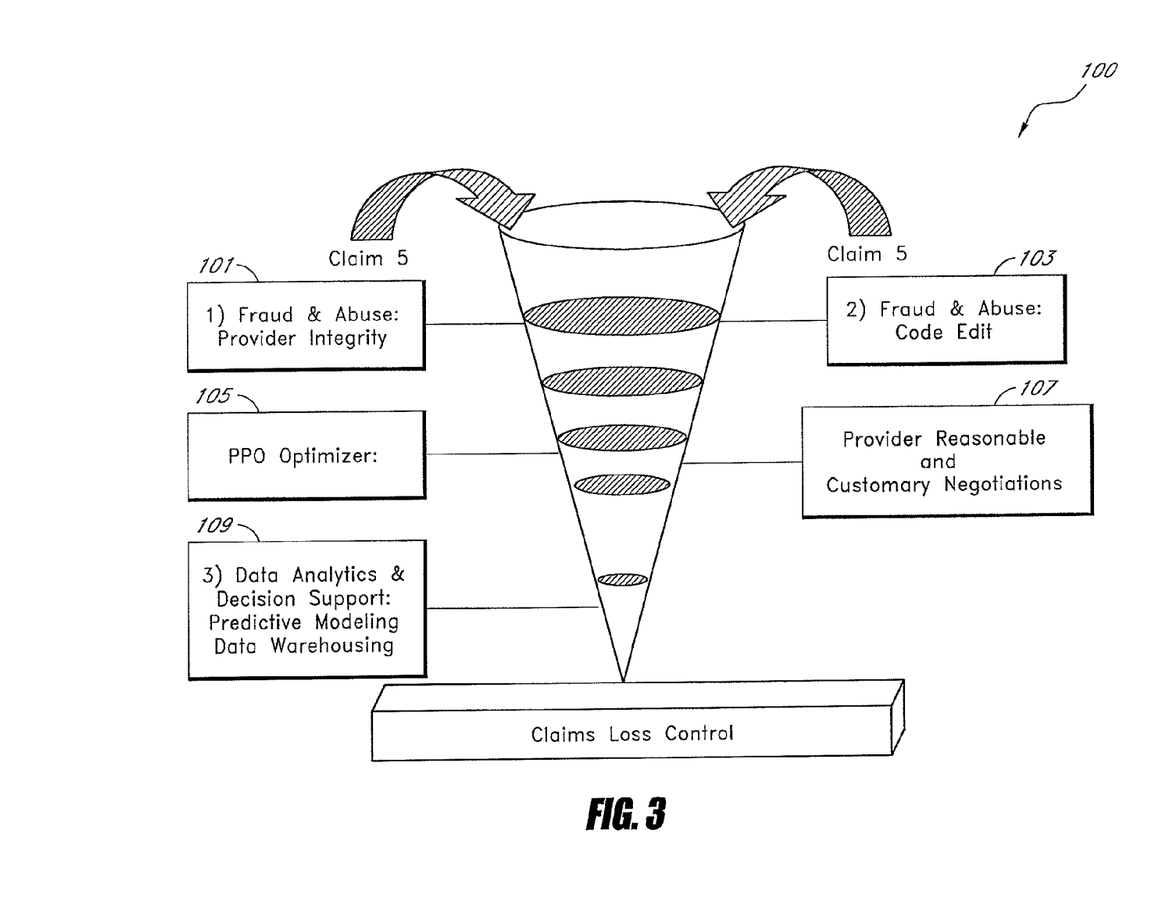
FIG. 3 is a schematic illustration of one embodiment of multiple loss control aspects of a healthcare claims loss control system and method.

FIG. 3 is a schematic illustration of multiple loss control aspects provided by embodiments of the system and method 100 in evaluating or processing a claim 5. One loss control aspect 101 of the system and method 100 is adapted for loss control generally directed to fraud and abuse which can also be considered to relate to provider integrity. This loss control aspect 101 reviews health care claims 5 that may represent questionable and/or abusive billing practices.

In certain implementations, this loss control aspect 101 accesses databases that can be maintained by the system 100 itself and, as an alternative, or in addition thereto, accesses databases from other entities, such as fraud ID collection services 60e and payers 60a. In one exemplary illustration of the loss control aspect 101, screening can be done for providers lacking proper licensing, former providers who are deceased, indicators that identity theft of a provider may be present in the claim 5, a high risk address of the provider, and/or providers with a previous history of abusive billing. The loss control aspect 101 can also utilize statistics, pattern recognition, and predictive models to identify more complex fraud schemes as well as to detect new and emerging fraud schemes. Further features of the loss control aspect 101 include the ability to screen for regulatory compliance issues, such as identifying suspected or known foreign agents, terrorists, drug traffickers and the like with whom transactions may be prohibited.

Another loss control aspect 103 of the system 100 is also directed generally to fraud and abuse and more particularly to code editing compliance. A health care claim 5 will typically include one or more service codes which indicate the particular service(s) and/or product(s) provided as part of the claim 5. These health care claim codes are based on national industry standards and present numerous possibilities for mistake or fraudulent use. For example, certain services which may be provided are assigned a bundled or combination code where the associated service includes multiple discreet services that are provided in combination.

Such services can be mistakenly or intentionally unbundled and instead coded for the individual services rather than the proper bundled service thereby improperly inflating the associated cost of the claim 5. The loss control aspect 103 can also in certain implementations, screen for "upcoding" where a code is inappropriately used for a more complex or extensive service than is properly indicated as well as duplicate or partial duplicate coding.

The loss control aspect 103 can also code edit for inappropriate assistant surgeon codes, codes which would generally not be considered medical necessities for the associated treatment or service, codes associated with excessive testing beyond that needed, and misuse of code modifiers. The loss control aspect 103 is supported by independently sourced and documented code edit references and thus satisfies regulated legal requirements.

A further loss control aspect 105 corresponds generally to a repricing evaluation or optimization. In one exemplary illustration, a claim 5 may already indicate a PPO discount lowering the cost of the claim. The loss control aspect 105 can further evaluate the claim 5 for possible eligibility for additional PPO discounts, such as secondary or tertiary PPO discounts. The system 100 maintains and accesses frequently updated databases of available PPO networks and PPO providers under which a claim 5 may be eligible for a discount. As another exemplary illustration, a claim 5 may arise from services provided outside the member's home network. The loss control aspect 105 can evaluate or screen to determine that even though the claim 5 may not be eligible for a primary PPO discount, there may exist alternative PPO discounts available under a different network.

An additional loss control aspect 107 of the system 100 is directed generally to provider discount negotiations or provider repricing. In certain embodiments, the system 100 accesses data sets, such as approved Medicare cost data, unit or service benchmarks, provider facility cost structures and/or cost-to-charge ratios for service facilities. The loss control aspect 107 can include negotiation with the provider for the particular facilities, equipment, and materials employed in the service resulting in the claim 5 and can further use information gathered by the system 100 to negotiate the associated costs.

In one embodiment, the loss control aspect 107 negotiates the cost of the claim 5 from a cost-plus basis rather than a billed charge-down approach. Thus, in certain implementations, the loss control aspect 107 seeks to arrive at a mutually agreeable negotiated repriced charge for the service based on a reasonable and customary (R & C) charge over the net costs of the service rather than negotiating what may be an inflated bill downwards. In certain embodiments, any negotiated or repriced charges resulting from the loss control aspect 107 include agreement on the part of the provider that any difference between the repriced claim and the originally billed claim will not be balance billed to the member.

Yet another loss control aspect 109 of the system 100 is directed generally to data analytics and decision support, predictive modeling, and data warehousing. The loss control aspect 109 provides a large warehouse of data that can be employed to predict future high risk members or member populations likely to incur high cost services. The loss control aspect 109 can also develop and provide predictive and analytic reports of service demand and disease progress.

The loss control aspect 109 can also facilitate early intervention to mitigate instances of high cost cases. For example, the loss control aspect 109 might identify indications that an individual member or member population exhibits indications likely to result in future high cost claims. Early identification by the aspect 109 can be helpful in mitigating such future costs, for example by enacting earlier medical intervention.

Figure 4:
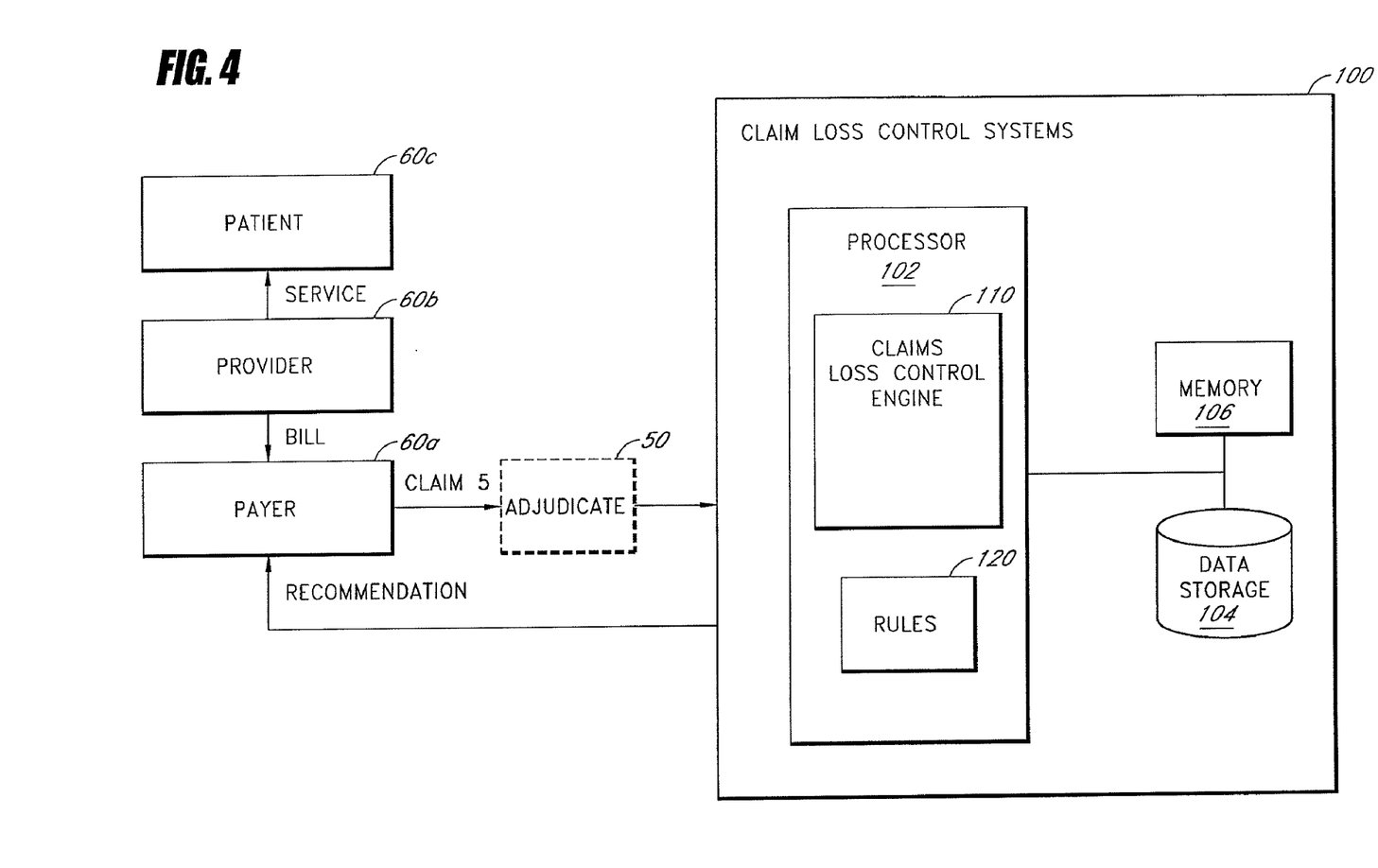
FIG. 4 is a more detailed block diagram of one embodiment of a healthcare claims loss control system and method.

FIG. 4 illustrates a block diagram of one embodiment of a health care claims loss control system and method 100. In this embodiment, a health care claim 5 results when the payer 60a receives a bill from the provider 60b for services provided to the member patient 60c. In certain embodiments, the claim 5 may undergo an adjudication process or block 50 and in other embodiments the claim 5 is provided to the system 100 without intervening adjudication. In this embodiment, the system 100 includes at least one processor 102 in communication with data storage 104 and memory 106.

It will be appreciated that in various embodiments, the processor 102, the data storage 104, and/or the memory 106 can be centrally located. In other embodiments, one or more of the processor 102, the data storage 104, and/or the memory 106 are distributed at multiple locations such that the system 100 can at least in certain embodiments at least partially comprise a distributed network. For example, in certain implementations it can be preferable that the data storage 104 be at least partially co-located with the processor 102 of the system 100. In other embodiments, the data storage is at least partially embodied at a location of another entity or party, such as a fraud ID collection service 60e and/or payer 60a.

In one embodiment, the processor 102 communicating with the data storage 104 and memory 106 operates a claim loss control engine 110 and claims loss control rules 120. In various embodiments, the claim loss control engine 110 and rules 120 evaluate or process an incoming claim 5 for improved loss control before payment of the incoming claim 5. As previously noted, components of the system 100 can be distributed such that, for example a database associated with the data storage 104 can be embodied in multiple locations, such as at least partly with the payer 60a.

Figure 5:
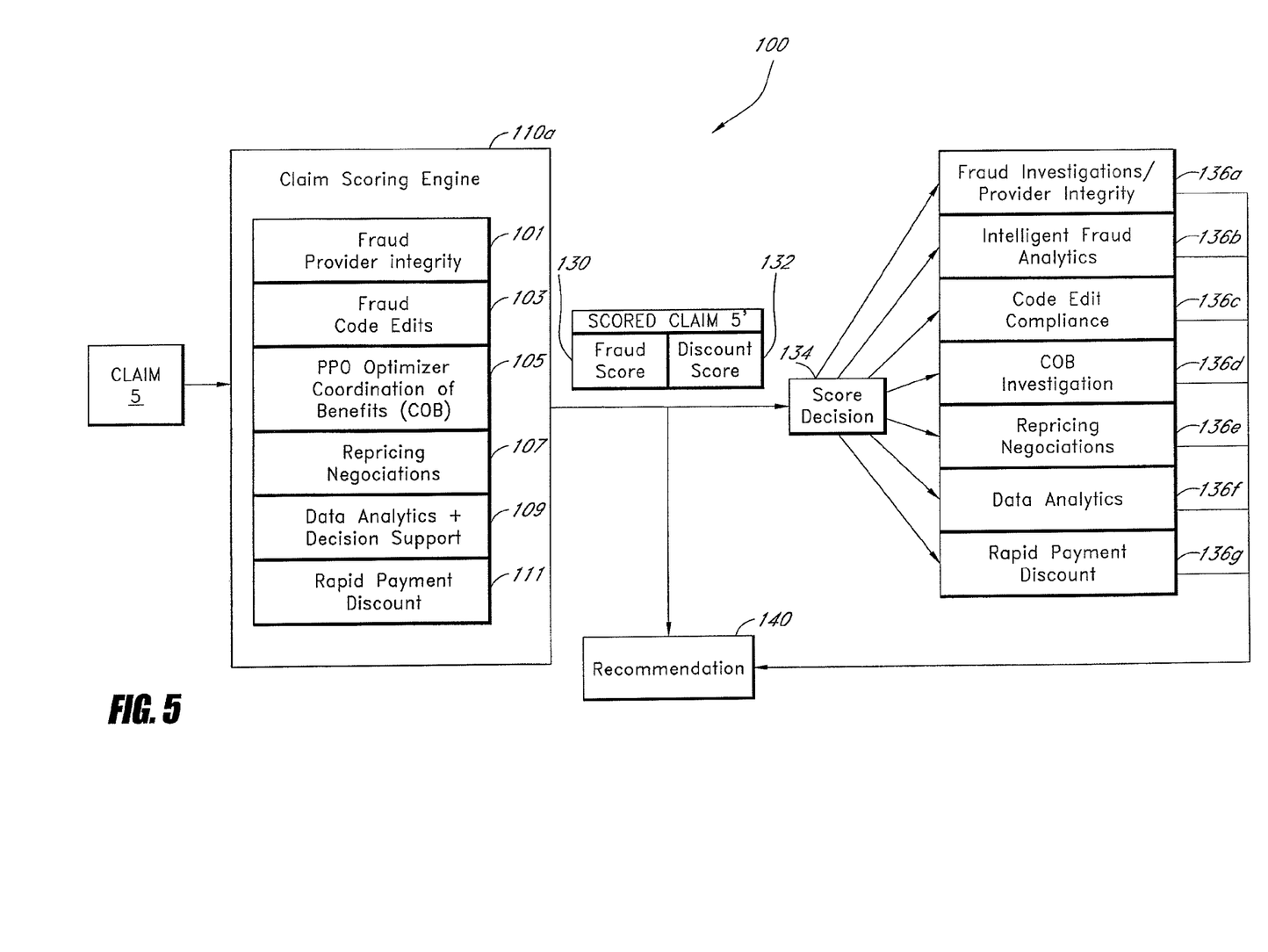
FIG. 5 is a block diagram of one embodiment of a healthcare claims loss control scoring engine and possible further processing.

FIG. 5 illustrates in greater detail a block diagram of one embodiment of a claim loss control engine 110 which in certain embodiments comprises a claim scoring engine 110a. In various embodiments, the claim scoring engine 110a evaluates the incoming claim 5 for one or more characteristics or parameters and develops an associated scored claim 5' wherein the scored claim 5' is generally indicative of loss control or cost saving opportunities for the claim 5. In one exemplary illustration, the claim scoring engine 10a evaluates the claim 5 based on one or more of the loss control aspects 101, 103, 105, 107, and/or 109. In one embodiment, the claim loss control engine 110a also evaluates a claim for possibility of an additional loss control aspect 111 relating to a rapid payment discount. In this embodiment, the claim 5 may be eligible for additional discounts in payment if agreement is reached between the payer and provider for expedited payment of the claim.

The scored claim 5' is indicative of loss control opportunities for the particular claim. In one embodiment, this includes one or both of a fraud score 130 and a discount score 132. The fraud score 130 is indicative of deficiencies or fraudulent aspects of the claim itself whereas the discount score 132 is indicative of additional discounts which may be available for payment of the claim 5 but not necessarily indicative of any inherent problem in the claim.

In certain embodiments, clients utilizing the services provided by the system and method 100 may simply desire further information about the claim 5, such as a scored claim 5' indicating loss control opportunities. Thus, in certain embodiments the system and method 100 returns a recommendation 140 to the payer 60a such that the payer 60a can take appropriate action in payment of the claim 5'. In certain implementations, the recommendation 140 can include a recommendation that the claim appears to be accurate and that no additional loss control opportunities have been identified, e.g., that the claim 5 should be paid as is. The recommendation 140 is in certain embodiments provided directly to the payer 60a and in other embodiments, a database of the system 100 is updated such that users of the system 100, such as the payer 60a can access the recommendation 140 at their convenience.

In other embodiments, the scored claim 5' is a variable or parameter for a score decision block 134. In the score decision block 134, the system and method 100 determine appropriate further processing or actions based at least partially on the result of the scoring of the system and method 100. In one exemplary embodiment, further processing of the scored claim 5' can include one or more of a fraud investigations/provider integrity evaluation of block 136a, intelligent fraud analytics 136b, code edit compliance 136c, coordination of benefits (COB) investigation 136d, repricing negotiations 136e, data analytics 136f and/or rapid payment discount 136g.

The selection of an appropriate one or more additional process 136 for the particular scored claim 5' will depend on the particular loss control opportunities represented in the scored claim 5'. Additional processing 136 can, in various embodiments, proceed in a serial or sequential manner or in a parallel manner or mixture thereof. In certain embodiments, particular additional processing 136 can be subject to unique instructions from a given payer client 60a. Implementation of particular selection and application of additional processing 136 can be readily implemented for the particular requirements of a given application by one of ordinary skill.

In certain embodiments, the results of one or more additional processes 136 performed further results in a recommendation 140. In certain implementations, the recommendation 140 can further comprise revision to an actual claim payment amount to be made in the claim payment block 40. For example, as previously described a provider 60b may agree to repricing negotiation that would be agreeable to the provider 60b as well as to the member patient 60c such that the recommendation 140 includes a lower payment amount such that the revised claim 5' resulting from the recommendation 140 reflects cost savings already realized for the payer 60a with satisfaction of payment to the provider 60b and without balance billing to the member patient 60c.

Figure 6:
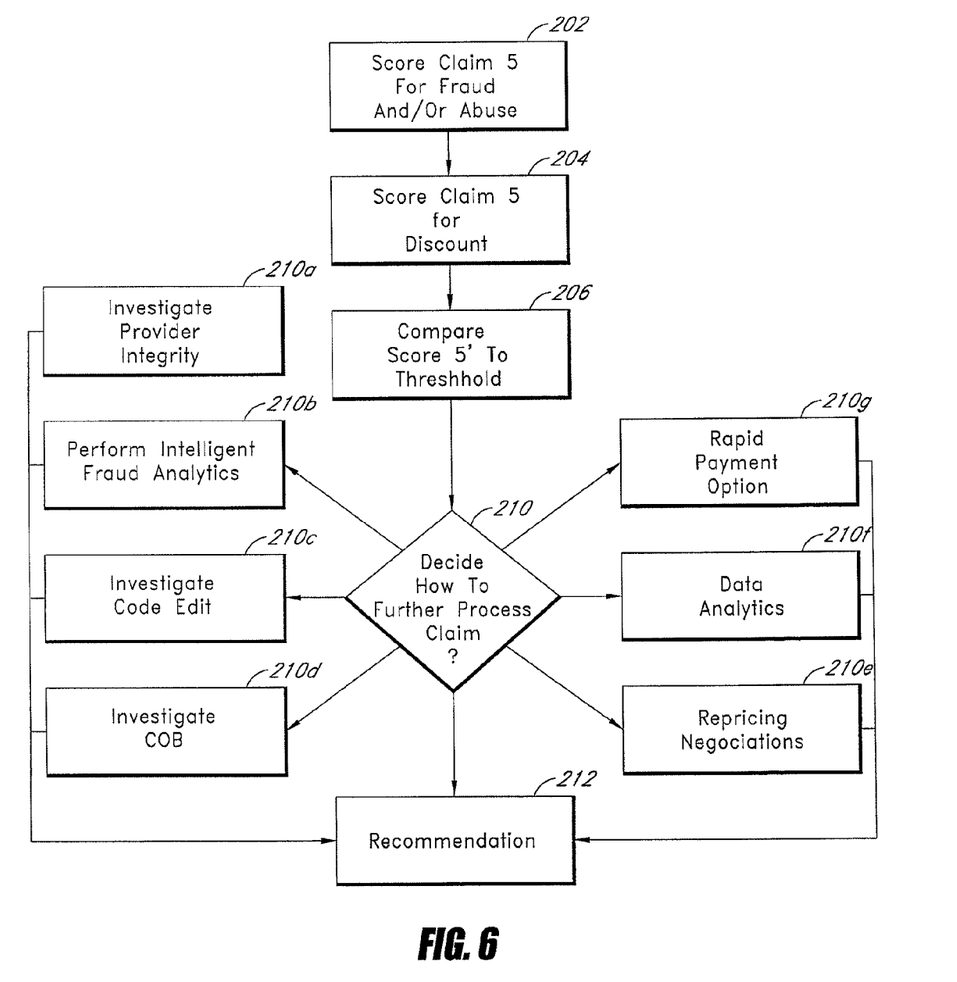
FIG. 6 is a flow chart of one embodiment of a healthcare claims loss control scoring system and method.

FIG. 6 illustrates in flowchart form, similar embodiments of the system and method 100 as illustrated in the block diagram of FIG. 5. In one embodiment, a claim 5 is scored for fraud and/or abuse in a block 202. The claim 5 is further scored for possible discounts in a block 204 and the resulting scores are compared to a threshold in block 206. A decision block 210 determines how a claim 5' is to be further processed.

As previously noted, in certain implementations the decision of block 210 is that a scored claim 5' will simply be provided as a recommendation 140 to the payer client 60a without further processing. In other embodiments, the claim 5' will be further processed according to one or more of blocks 210a, 210b, 210c, 210d, 210e, 210f, and/or 210g corresponding to the previously described further processing of block 136a through 136g respectively. The results of the further processing will be incorporated in the recommendation 140 provided in block 212 and as previously noted can in certain embodiments include an adjustment in the recommended claim payment amount such that the payer 60a realizes cost savings before payment of the claim.

Figure 7:
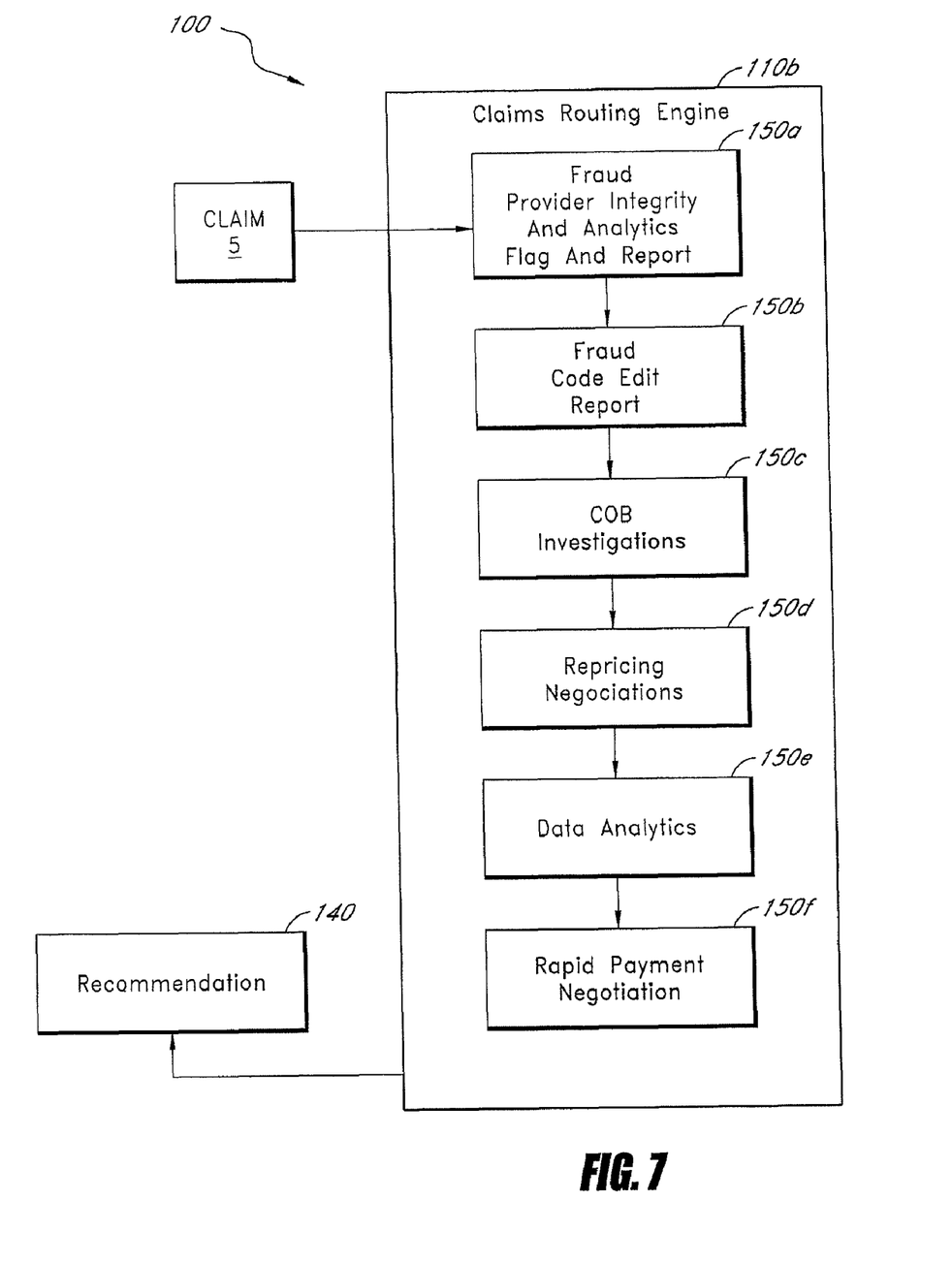
FIG. 7 is a block diagram of one embodiment of a healthcare claims routing system and method for improved loss control.

FIG. 7 illustrates a block diagram of a further embodiment of the system and method 100 comprising a claims loss control engine 110 configured generally as a claims routing engine 110b. In one embodiment, a claim 5 is provided to the system 100 generally as previously described. However, rather than developing a score for the claim 5, the claims routing engine 110b is capable of automatically processing the claim 5 according to one or more processing blocks 150.

In one embodiment, the claims routing engine 110b comprises a fraud provider integrity and analytics block 150a which would generate a fraud flag and report and in certain implementations be further processed for fraud investigation. In one embodiment, the claims routing engine 110b also comprises a fraud code edit block 150b configured for code editing compliance. One embodiment of the claims routing engine 110b also comprises a coordination of benefits (COB) investigations block 150c, a repricing negotiation block 150d, a data analytics block 150e and a rapid payment negotiation block 150f.

While FIG. 7 illustrates the blocks 150a through 150f of the claims routing engine 110b arranged serially and in an illustrated order, it should be understood that this is simply illustrative of one exemplary embodiment. In certain embodiments, multiple blocks 150a through 150f can be performed serially and in a desired order. In other embodiments, multiples of the blocks 150a through 150f can be performed in parallel or in a combination of parallel and serial processing.

FIG. 7 does however illustrate generally one embodiment of arrangement of the blocks 150a through 150f of a claims routing engine 110b that may be preferable in certain implementations. For example, if a block 150a directed to fraud provider integrity and analytics determines indications of a fraudulent claim, it may be preferred that system and method 100 resources not be further committed, for example to repricing negotiations 150d or rapid payment negotiations 150f for a claim which may be fraudulent. Instead, in certain implementations, it would be more preferred that fraud issues raised in a block 150a be resolved before further loss control analysis or that the recommendation 140 simply be that the claim be refused for payment because of the fraud issues revealed in block 150a.

Figure 8:
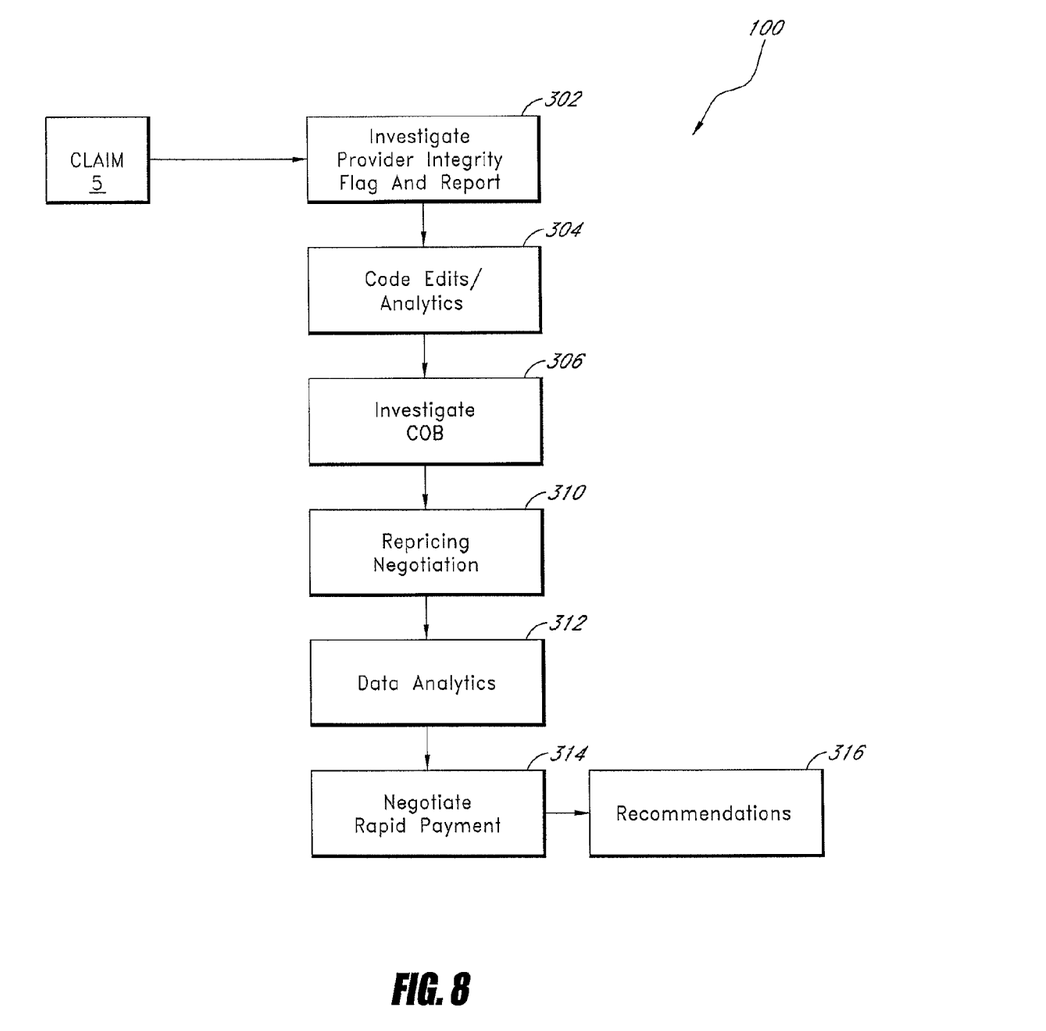
FIG. 8 is a flow chart of one embodiment of a healthcare claims routing system and method for improved loss control.

FIG. 8 is a flowchart illustration of certain embodiments corresponding generally to those illustrated and described with respect to the block diagram of FIG. 7. In an exemplary embodiment, a claim 5 proceeds through one or more of a provider and analytics block 302, a code edits/analytics block 304, and investigation of coordination of benefits block 306, a repricing negotiation block 310, a data analytics block 312, and/or a rapid payment negotiation block 314. Again, as previously noted depending on the requirements and indications of a given claim, one or more of the blocks 302, 304, 306, 310, 312, and/or 314 may be omitted or bypassed and these blocks may be performed serially, in parallel, or in a combination of serial and parallel processing. Also, a block 316 is included wherein the recommendation 140 is provided to the payer client 60a.

Figure 9:
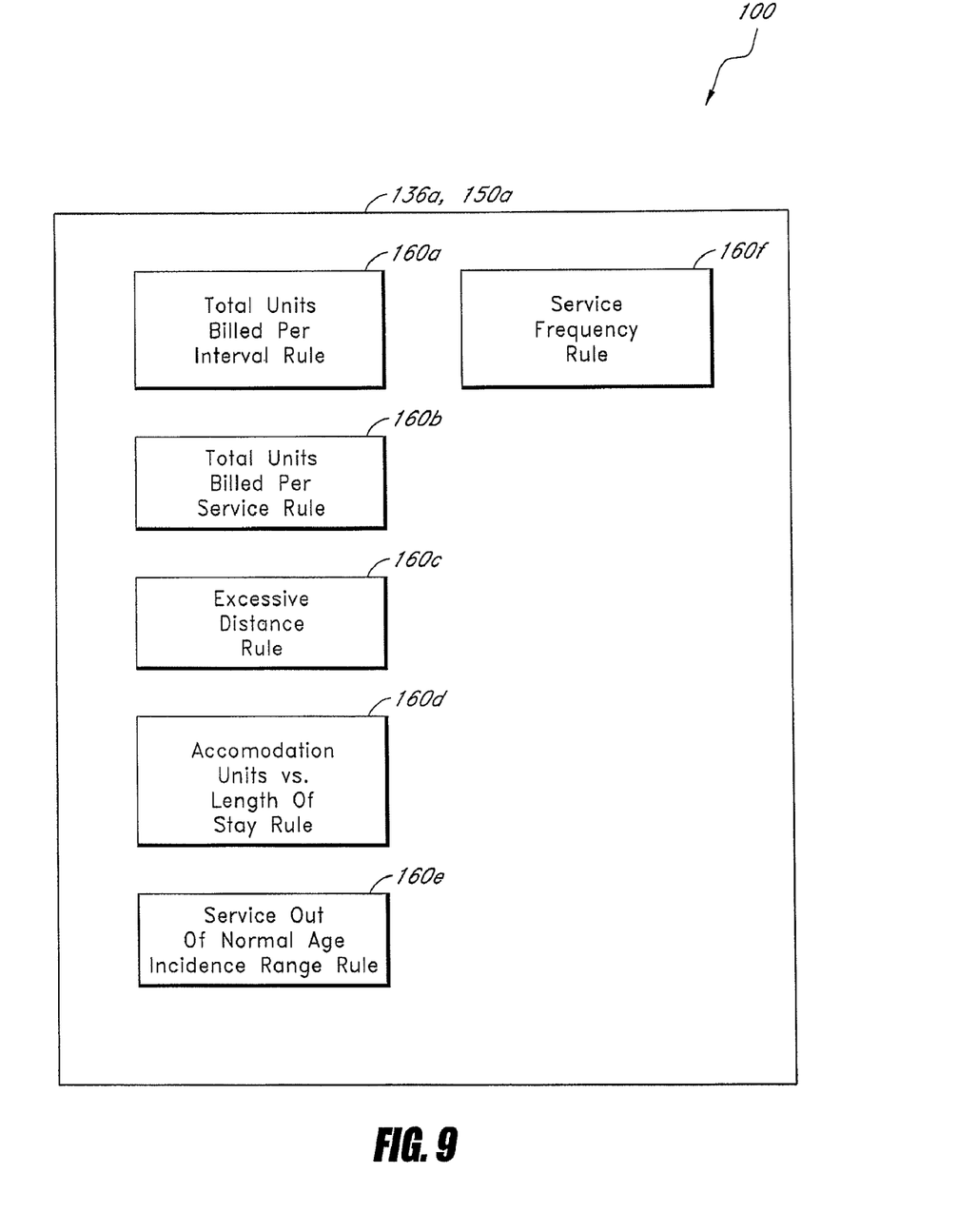
FIG. 9 is a block diagram of one embodiment of fraud rules that can be applied in of a healthcare claims loss control system and method.

FIG. 9 illustrates various embodiments of fraud rules embodied in certain embodiments of the further processing blocks 136a and/or 150a. FIG. 9 illustrates schematically various fraud rules 160 that can be applied to a given claim 5 to screen the claim 5 for possible indications of a fraudulent claim. In various embodiments, this can include application of one or more fraud rules 160a through 160f as well as additional rules. Fraud rule 160a is directed generally to a rule for evaluation of the total units billed in a given interval.

The fraud rule 160a would generally be applied when units, such as medication units, are billed to a claim and where additional billing of similar units has previously occurred. In one embodiment of the fraud rule 160a, a number of current units billed in the claim 5 is added to a number of similar units previously billed in associated claims by the provider within a given interval, for example within a previous six month interval.

This results in a total sum of the units billed within the selected interval including the units billed in the current claim 5. This sum is then compared to a threshold and the claim is flagged for fraud indications if the sum exceeds the threshold for total number of units within the given interval.

One embodiment of a fraud rule 160b is generally directed to analyzing the total number of units billed for a single service. In one embodiment, the total number of units billed in the claim for a given service is totaled and compared to a determined threshold. In one embodiment of the fraud rule 160b, the threshold for comparison is determined as a function of at least one of the member patient's weight and their body mass index. For example, it would be expected that an appropriate total number of units billed for certain services, for example medication or chemotherapy treatments, would vary somewhat depending on the treated person's weight or size.

In one embodiment, a fraud rule 160c is directed generally to evaluating distances between a member patient's home address and a service location. For example, it would be expected that a member patient would seek and receive service from a provider relatively close to their home location. While in certain instances, a member patient may simply be traveling and seek and receive service from a provider, often an exaggerated distance from their home, an excessive distance is an indicator of possible fraud.

Thus, in one embodiment, the fraud rule 160c calculates a distance between the member patient's home address and a service location and compares this distance to a threshold. In certain embodiments, the distance threshold can vary depending on whether or not one or more of the member patient's home address and/or service location is a rural location versus an urban location. Generally, it would be expected that patients and service providers in an urban area would be expected to travel a lesser distance than a member patient and service provider in a more rural setting.

One embodiment of a fraud rule 160d is directed generally to evaluating billing of a combination unit to the patient's length of stay. For example, it would be generally expected that there be a one to one correspondence between the length of stay of a patient at a service facility and the accommodation unit billed for that stay. Thus, in one embodiment the fraud rule 160d identifies a span from a date in, through a date out, for an inpatient stay.

The fraud rule 160d further evaluates any billed accommodation units associated with the claim 5. The fraud rule 160d in one embodiment, flags the claim 5 for fraud indications if a total of the billed combination units exceeds the date span of the length of stay, or if multiple accommodation units are billed for one or more same dates of service or if a combination units are billed for dates outside the length of stay span.

One embodiment of a fraud rule 160e is directed generally to evaluating the age appropriateness of services reflected in a claim 5. For example, infants and young children generally have not developed frontal sinuses. Thus, a claim coded for frontal sinus procedures when the member patient is an infant or young child would be unusual at best and an indicator of possible fraud.

Similarly, certain procedures and services would be expected for a newborn baby but would be highly suspicious if indicated as being provided to an adult or senior. Thus, in one embodiment, the fraud rule 160e determines or accesses a normal age incidence range for a given service. The fraud rule 160e compares a determined age of the member patient to this normal age incidence range, and flags the claim 5 for fraud indications if the member patient's age lies outside of the normal age incidence range.

One embodiment of a service frequency rule 160f is directed generally to evaluating a frequency history for a given service. For example, certain services typically indicate only a single visit and repeated visits indicating the same service type or multiple services of the same type on a given date of service would be highly suspicious and result in flagging the claim 5 for fraud indications.

Although the above disclosed embodiments have shown, described and pointed out novel features of the invention as applied to the above-disclosed embodiments, it should be understood that various omissions, substitutions, and changes in the form of the detail of the devices, systems and/or methods illustrated may be made by those skilled in the art without departing from the scope of the present teachings. Consequently, the scope of the invention should not be limited to the foregoing description but should be defined by the appended claims.

What is claimed is:

1. A method of controlling healthcare claim payment losses, the method comprising:

receiving from a payer a healthcare claim for services rendered to a patient by a provider, wherein a payer has screened the healthcare claim to confirm eligibility and further screened the healthcare claim to confirm compensability and wherein the payer has further determined that any related deductibles have been satisfied such that the payer is prepared to pay the healthcare claim, but prior to payment of the healthcare claim;

evaluating the information for potential fraudulent activity associated with the healthcare claim wherein evaluating the information for potential fraudulent activity comprises running a plurality of rules, wherein the rules comprise:

a first rule executing in one or more computer processors that accesses a database of provider information to determine whether the provider is licensed to provide the services set forth in the healthcare claim;

a second rule executing in one or more computer processors that determines whether the distance between a patient's location as set forth in the healthcare claim and a provider's location as set forth in the healthcare claim exceeds a threshold, wherein the threshold varies based on whether the patient's home address is a rural location or an urban location and wherein the second rule is performed without reference to other healthcare claims associated with the provider and without reference to other healthcare claims associated with the patient;

a third rule executing in one or more computer processors that compares billings as set forth in the healthcare claim to a patient's length of stay at a service facility as set forth in the healthcare claim, wherein the third rule is performed without reference to other healthcare claims associated with the provider and without reference to other healthcare claims associated with the patient; and a fourth rule executing in one or more computer processors that determines whether the services set forth in the healthcare claim are for single service billings and wherein the fourth rule accesses a frequency history of past services rendered to the patient to determine whether the single service billings have occurred multiple times; a fifth rule executing in one or more computer processors that determines whether the services provided to the patient as set forth in the healthcare claim are appropriate for the age of the patient;

providing notification of potential fraud based at least partially on whether the plurality of rules indicate potential fraudulent activity, prior to the payer paying the healthcare claim.

2. The method of claim 1, wherein the payer provides the access to the information about the health care claim.

3. The method of claim 1, further comprising routing the healthcare claim for further processing based on evaluated risk of fraud or elevated potential for discount.

4. The method of claim 3, further comprising at least one of recommending payment of the healthcare claim and providing results of the further processing to the payer, prior to the payer paying the healthcare claim.

5. The method of claim 1, wherein the method is performed by a third party.

6. The method of claim 1, when the rules do not indicate potential fraudulent activity, automatically evaluating the information for possible provider discounts and alternative provider discounts prior to the payer paying the healthcare claim.

7. The method of claim 6, wherein evaluating the information for possible discounts comprises identifying opportunities for repricing negotiations with the provider.

8. The method of claim 7, further comprising determining reasonable and customary charges for provided services.

9. The method of claim 6, wherein evaluating the information for possible discounts comprises identifying opportunities for rapid payment discounts.

10. A loss control system for healthcare claims, the system comprising:

a database of information about one or more healthcare claims;

a loss control engine in communication with the database, wherein the loss control engine is configured to access information about healthcare claims from the database after the healthcare claims have been processed by a payer such that the payer has screened the healthcare claims to confirm eligibility and compensability and wherein the payer has further determined that any related deductibles have been satisfied such that the payer is prepared to pay the healthcare claim, but prior to payment of the healthcare claim, and wherein the loss control engine is further configured to analyze one or more of the healthcare claims for potential cost savings by evaluating the information for potential fraudulent activity, wherein the evaluating comprises a plurality of rules:

a first rule executing in one or more computer processors that is configured to access a database of provider information to determine whether the provider is licensed to perform the services set forth in the healthcare claim;

a second rule executing in one or more computer processors that determines whether the distance between a patient's location as set forth in the healthcare claim and a provider's location as set forth in the healthcare claim exceeds a threshold, wherein the threshold varies based on whether the patient's home address is a rural location or an urban location and wherein the second rule is performed without reference to other healthcare claims associated with the provider and without reference to other healthcare claims associated with the patient;

a third rule executing in one or more computer processors that compares billings as set forth in the healthcare claim to a patient's length of stay at a service facility as set forth in the healthcare claim, wherein the third rule is further performed without reference to other healthcare claims associated with the provider and without reference to other healthcare claims associated with the patient;

a fourth rule executing in one or more computer processors that determines whether the services as set forth in the healthcare claim are for single service billings and wherein the fourth rule further accesses a frequency history of past services rendered to the patient to determine whether the single service billings have occurred multiple times;

a fifth rule executing in one or more computer processors that determines whether the services provided to the patient as set forth in the healthcare claim are appropriate for the age of the patient; and wherein the loss control engine is further configured to provide notification of potential fraud based on whether the plurality of rules indicate potential fraudulent activity before payment of the respective healthcare claim.

11. The loss control system of claim 10, wherein the database comprises healthcare claim information developed by a payer and wherein a recommendation is returned to the payer.

12. The loss control system of claim 11, wherein the healthcare claim information comprises an adjudication of the healthcare claim by the payer prior to the healthcare claim being accessed by the loss control engine.

13. The loss control system of claim 11, wherein the system comprises communication with at least a payer and a provider and wherein the recommendation comprises a reduction in the healthcare claim negotiated with the provider for at least certain healthcare claims.

14. The loss control system of claim 11, wherein the recommendation comprises predictions of future high risk healthcare claims.

15. The loss control system of claim 11, wherein the recommendation comprises at least one of the group comprising fraud identification, claim code editing compliance, and identification of additional discounts.

16. The loss control system of claim 15, wherein the loss control engine further performs additional processing when potential cost savings are identified and returns results of the additional processing with the recommendation, wherein the additional processing comprises one or more of fraud investigation, editing of a miscoded healthcare claim, providing additional preferred provider organization discounts, and negotiating reduced healthcare claim charges with a provider.

* * * * *